United States Patent
Song

(10) Patent No.: US 9,219,688 B2
(45) Date of Patent: Dec. 22, 2015

(54) METHOD AND SYSTEM FOR NETWORK LOAD BALANCING

(71) Applicant: Huawei Technologies Co., Ltd., Shenzhen, Guangdong (CN)

(72) Inventor: Junjun Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 14/068,740

(22) Filed: Oct. 31, 2013

(65) Prior Publication Data

US 2014/0119187 A1    May 1, 2014

(30) Foreign Application Priority Data

Nov. 1, 2012 (CN) .......................... 2012 1 0430491

(51) Int. Cl.
  *H04L 12/803* (2013.01)
  *H04L 29/12* (2006.01)
  *H04L 12/18* (2006.01)
  *H04L 12/741* (2013.01)

(52) U.S. Cl.
  CPC ............ *H04L 47/125* (2013.01); *H04L 12/185* (2013.01); *H04L 61/103* (2013.01); *H04L 45/74* (2013.01)

(58) Field of Classification Search
  None
  See application file for complete search history.

(56) References Cited

U.S. PATENT DOCUMENTS

| | | | |
|---|---|---|---|
| 7,009,974 B1* | 3/2006 | Fotedar | 370/392 |
| 7,480,737 B2* | 1/2009 | Chauffour et al. | 709/245 |
| 8,565,069 B2* | 10/2013 | Khetan et al. | H04L 12/4641 370/217 |
| 2005/0076145 A1* | 4/2005 | Ben-Zvi et al. | 709/245 |
| 2007/0165648 A1* | 7/2007 | Joo | 370/395.54 |
| 2008/0250123 A1* | 10/2008 | Chae et al. | 709/220 |
| 2011/0292939 A1* | 12/2011 | Subramaian et al. | H04L 45/54 370/392 |
| 2012/0089714 A1* | 4/2012 | Carley | 709/223 |
| 2013/0039218 A1* | 2/2013 | Narasimhan et al. | 370/255 |
| 2014/0198808 A1* | 7/2014 | Zhou | H04L 61/103 370/475 |

FOREIGN PATENT DOCUMENTS

| | | | |
|---|---|---|---|
| EP | 1868354 A1 | 12/2007 | |
| WO | WO 2011123007 A1 | 10/2011 | |

* cited by examiner

*Primary Examiner* — Yemane Mesfin
*Assistant Examiner* — Peter Chen
(74) *Attorney, Agent, or Firm* — Leydig, Voit & Mayer, Ltd.

(57) ABSTRACT

The present invention provides a processing method, device and system for controlling packet broadcast. The method includes: obtaining, by a first device, a cluster MAC address, and determining an egress port of the first device corresponding to the cluster MAC address; and establishing, by the first device, a cluster table, where the cluster table is used to record correspondence between address information and the egress port of the first device, and the address information includes the cluster MAC address, so that the first device forwards a packet from the egress port of the first device corresponding to the cluster MAC address according to the cluster table after receiving the packet whose destination MAC address is the cluster MAC address. Embodiments of the present invention can reduce network traffic burdens.

8 Claims, 4 Drawing Sheets

METHOD AND SYSTEM FOR NETWORK LOAD BALANCING

CROSS-REFERENCE TO RELATED APPLICATION

This application claims priority to Chinese Patent Application No. 201210340491.4, filed on Nov. 1, 2012, which is hereby incorporated by reference in its entirety.

TECHNICAL FIELD

The present invention relates to communications technologies, and in particular, to a processing method, device and system for controlling packet broadcast.

BACKGROUND

Network load balancing (NLB) is a software-based windows load balancing solution provided by Microsoft. An NLB cluster allows a user to use two or more servers in combination to form one server cluster, which works like one server from the perspective of a client. Each server is also called an NLB node.

NLB working modes include a unicast working mode, a multicast working mode, and an Internet Group Management Protocol (IGMP) working mode. In the unicast working mode and the multicast working mode, the NLB node uses a cluster media access control (MAC) address for NLB communication. That is, a destination MAC address of a data packet sent by an Internet Protocol (IP) network to the NLB node is a cluster MAC address, and the cluster MAC address is not bound to a port. Consequently, a forwarding device broadcasts the data packet on all ports, which increases network traffic burdens.

SUMMARY

In view of this, embodiments of the present invention provide a processing method, device and system for controlling packet broadcast, which are used for reducing network traffic burdens.

In a first aspect, a processing method for controlling packet broadcast is provided, including:

obtaining, by a first device, a cluster MAC address, and determining an egress port of the first device corresponding to the cluster MAC address; and establishing, by the first device, a cluster table, where the cluster table is used to record correspondence between address information and the egress port of the first device, and the address information includes the cluster MAC address, so that the first device forwards a packet from the egress port of the first device corresponding to the cluster MAC address according to the cluster table after receiving the packet whose destination MAC address is the cluster MAC address.

In a second aspect, a processing device for controlling packet broadcast is provided, including:

an obtaining module, configured to obtain a cluster MAC address, and determine an egress port of a first device corresponding to the cluster MAC address; and an establishing module, configured to establish a cluster table, where the cluster table is used to record correspondence between address information and the egress port of the first device, and the address information includes the cluster MAC address, so that the first device forwards a packet from the egress port of the first device corresponding to the cluster MAC address according to the cluster table after receiving the packet whose destination MAC address is the cluster MAC address.

In a third aspect, a processing system for controlling packet broadcast is provided, including:

a layer-3 device, configured to: broadcast an ARP request packet, and receive an ARP response packet, where the ARP response packet includes a cluster MAC address of a target NLB cluster and a private MAC address of an NLB node of the target NLB cluster; establish a cluster ARP table, where the cluster ARP table is used to record correspondence between address information of the layer-3 device and an egress port of the layer-3 device, the address information of the layer-3 device includes the cluster MAC address and a source MAC address, and the source MAC address is the private MAC address of the NLB node; and send a notification message to a layer-2 device through the egress port of the layer-3 device, where the notification message includes the cluster MAC address and the source MAC address; and the layer-2 device, configured to: receive the notification message sent by the layer-3 device, where the notification message includes the cluster MAC address and the source MAC address; determine an egress port of the layer-2 device corresponding to the source MAC address according to the source MAC address; and establish a cluster MAC table, where the cluster MAC table is used to record correspondence between address information of the layer-2 device and the egress port of the layer-2 device, and the address information of the layer-2 device includes the cluster MAC address.

In the foregoing technical solutions, a first device establishes a cluster table, where the cluster table records correspondence between a cluster MAC address and an egress port of the first device. Therefore, after the first device determines that a destination MAC address of a packet is the cluster MAC address, the first device may forward the packet through the corresponding egress port according to the correspondence, without the need of broadcasting the packet through all egress ports, thereby reducing network traffic burdens.

BRIEF DESCRIPTION OF DRAWINGS

To illustrate the technical solutions in the embodiments of the present invention more clearly, the following briefly introduces the accompanying drawings for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
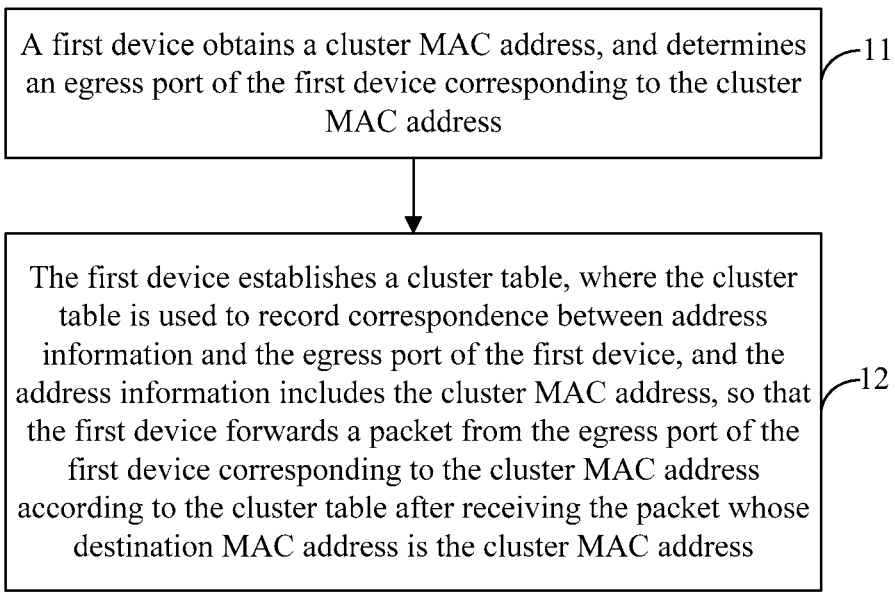
FIG. 1 is a schematic flowchart of an embodiment of a processing method for controlling packet broadcast according to the present invention.

FIG. 1 is a schematic flowchart of an embodiment of a processing method for controlling packet broadcast according to the present invention. The method includes:

11. A first device obtains a cluster MAC address, and determines an egress port of the first device corresponding to the cluster MAC address.

12. The first device establishes a cluster table, where the cluster table is used to record correspondence between address information and the egress port of the first device, and the address information includes the cluster MAC address, so that the first device forwards a packet from the egress port of the first device corresponding to the cluster MAC address according to the cluster table after receiving the packet whose destination MAC address is the cluster MAC address.

In this embodiment, a cluster table is established, where the cluster table records correspondence between a cluster MAC address and an egress port of a first device. Therefore, after the first device determines that a destination MAC address of a packet is the cluster MAC address, the first device may forward the packet through the corresponding egress port according to the correspondence, without the need of broadcasting the packet through all egress ports, thereby reducing network traffic burdens.

Optionally, the first device may a layer-2 device or layer-3 device, and specifically, may be a layer-2 switch or layer-3 switch.

Figure 2:
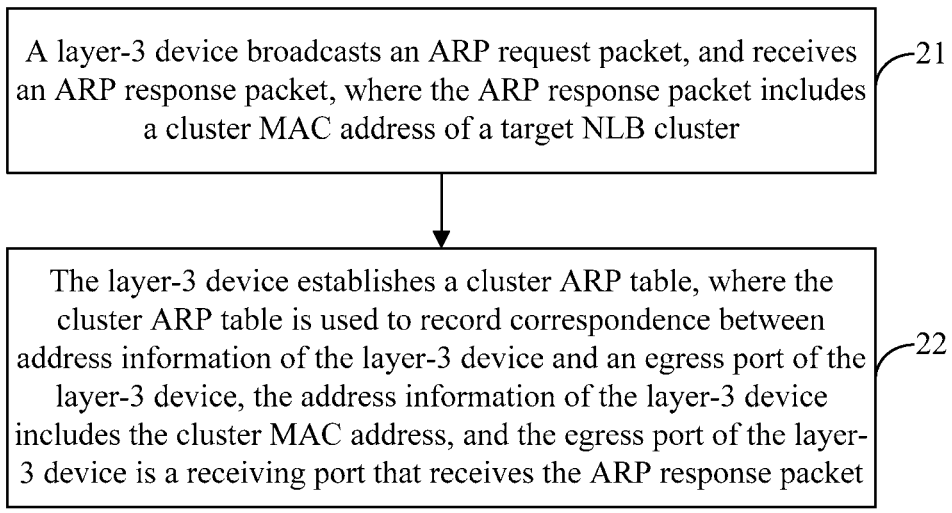
FIG. 2 is a schematic flowchart of a specific implementation manner of FIG. 1.

When the first device is a layer-3 device, referring to FIG. 2, a specific implementation manner is provided, including:

21. The layer-3 device broadcasts an Address Resolution Protocol (ARP) request packet, and receives an ARP response packet, where the ARP response packet includes a cluster MAC address of a target NLB cluster.

22. The layer-3 device establishes a cluster ARP table, where the cluster ARP table is used to record correspondence between address information of the layer-3 device and an egress port of the layer-3 device, the address information of the layer-3 device includes the cluster MAC address, and the egress port of the layer-3 device is a receiving port that receives the ARP response packet.

Optionally, the ARP response packet further includes a private MAC address of an NLB node of the target NLB cluster.

The address information of the layer-3 device further includes a source MAC address, where the source MAC address is the private MAC address of the NLB node.

The method further includes:

The layer-3 device sends a notification message to a layer-2 device through the egress port of the layer-3 device, where the notification message includes the cluster MAC address and the source MAC address so that the layer-2 device establishes correspondence between address information of the layer-2 device and an egress port of the layer-2 device according to the cluster MAC address and the source MAC address.

In this embodiment, a layer-3 device establishes a cluster ARP table to record correspondence between a cluster MAC address and an egress port of the layer-3 device. Therefore, after the layer-3 device determines that a destination MAC address of a packet is the cluster MAC address, the layer-3 device may forward the packet through the corresponding egress port of the layer-3 device according to the correspondence, without the need of broadcasting the packet through all egress ports of the layer-3 device, thereby reducing network traffic burdens.

Figure 3:
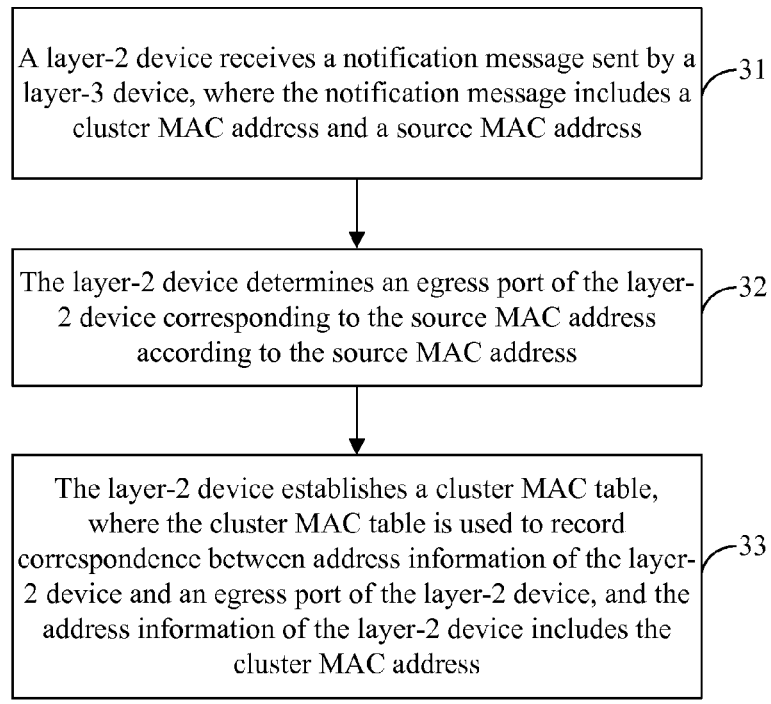
FIG. 3 is a schematic flowchart of another specific implementation manner of FIG. 1.

When the first device is a layer-2 device, referring to FIG. 3, another specific implementation manner is provided, including:

31. The layer-2 device receives a notification message sent by a layer-3 device, where the notification message includes the cluster MAC address and a source MAC address.

32. The layer-2 device determines an egress port of the layer-2 device corresponding to the source MAC address according to the source MAC address.

33. The layer-2 device establishes a cluster MAC table, where the cluster MAC table is used to record correspondence between address information of the layer-2 device and the egress port of the layer-2 device, and the address information of the layer-2 device includes the cluster MAC address.

Optionally, the notification message further includes virtual local area network (VLAN) information.

The address information of the layer-2 device further includes the VLAN information so that the layer-2 device forwards a packet from the egress port of the layer-2 device corresponding to the cluster MAC address and the VLAN information, where a destination MAC address of the packet is the cluster MAC address, and a VLAN to which the packet belongs is a VLAN indicated by the VLAN information.

In this embodiment, a layer-2 device establishes a cluster MAC table to record correspondence between a cluster MAC address and an egress port of the layer-2 device. Therefore, after the layer-2 device receives a packet whose destination MAC address is the cluster MAC address, the layer-2 device may forward the packet through the corresponding egress port of the layer-2 device according to the correspondence, without the need of broadcasting the packet through all egress ports of the layer-2 device, thereby reducing network traffic burdens.

Figure 4:
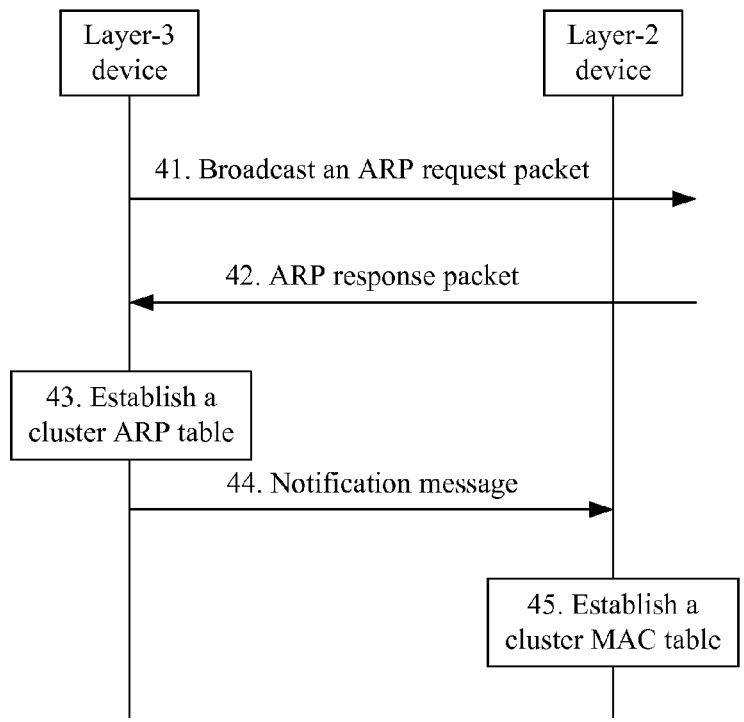
FIG. 4 is a schematic flowchart of another embodiment of a processing method for controlling packet broadcast according to the present invention.
Figure 5:
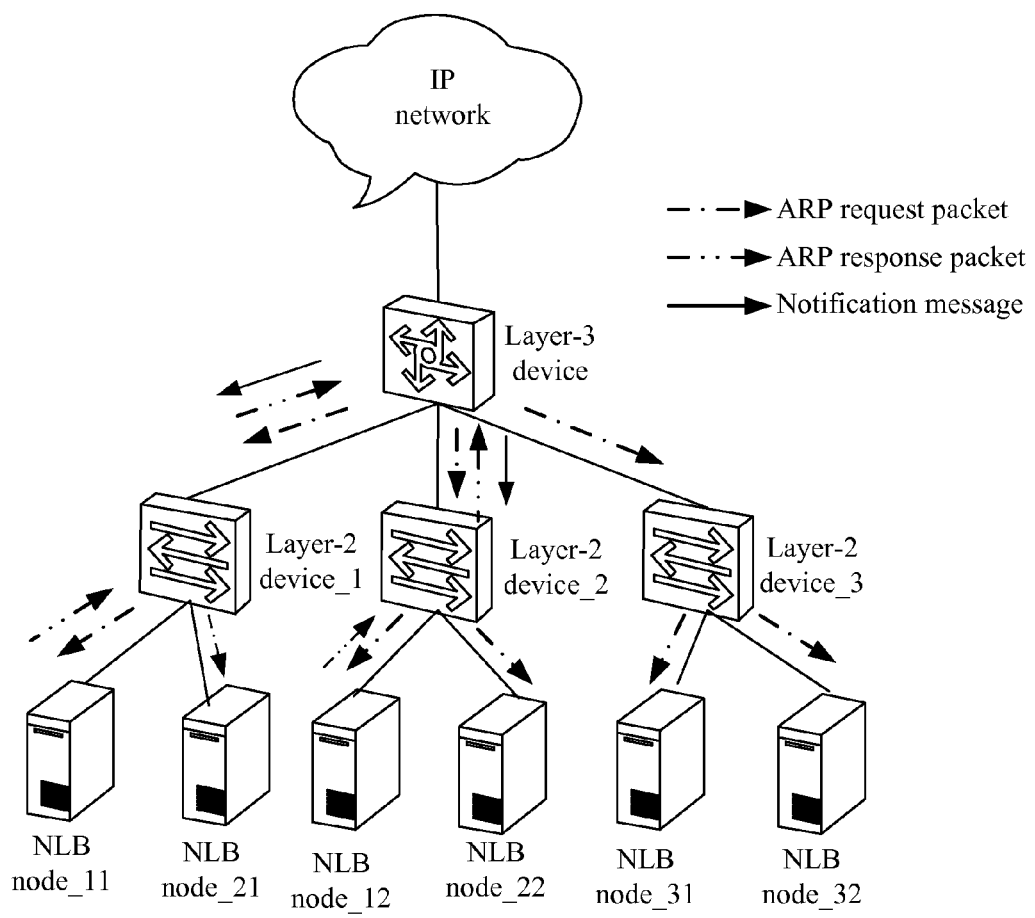
FIG. 5 is a schematic structural diagram of a system corresponding to FIG. 4.

FIG. 4 is a schematic flowchart of another embodiment of a processing method for controlling packet broadcast according to the present invention, and FIG. 5 is a schematic structural diagram of a system corresponding to FIG. 4.

As shown in FIG. 5, in this embodiment, NLB nodes are divided into three NLB clusters. A first NLB cluster includes NLB node_11 and NLB node_12, a second NLB cluster includes NLB node_21 and NLB node_22, and a third NLB cluster includes NLB node_31 and NLB node_32. This embodiment includes three layer-2 devices, where layer-2 device_1 serves NLB node_11 and NLB node_21, layer-2 device_2 serves NLB node_12 and NLB node_22, and layer-2 device_3 serves NLB node_31 and NLB node_32. It is assumed that a port between a layer-3 device and layer-2 device_1 is port_31, a port between the layer-3 device and layer-2 device_2 is port_32, a port between the layer-3 device and layer-2 device_3 is port_33, ports between layer-2 device_1 and NLB node_11 and between layer-2 device_1 and NLB node_21 are port_211 and port_212 respectively, ports between layer-2 device_2 and NLB node_12 and between layer-2 device_2 and NLB node_22 are port_221 and port_222 respectively, ports between layer-2 device_3 and NLB node_31 and between layer-2 device_3 and NLB node_32 are port_231 and port_232 respectively (for brevity, FIG. 5 does not show names of the ports). The foregoing layer-3 device and layer-2 devices may be a layer-3 switch and layer-2 switches respectively.

When multiple NLB nodes make up an NLB cluster, each NLB cluster has one cluster IP address. A destination IP address of a data packet sent by an IP network is a cluster IP address of a target NLB cluster. Each NLB node in the NLB cluster receives the data packet, and then, according to an extent of NLB running on the NLB node, the NLB node determines whether to process the data packet by itself. For example, when the IP network sends a data packet to the first NLB cluster, that is, when a target NLB cluster is the first NLB cluster, the data packet passes through the layer-3 device and layer-2 device_1 and arrives at NLB node_11, and passes through the layer-3 device and layer-2 device_2 and arrives at NLB node_12. In addition, in the existing technology, a cluster MAC address is used for forwarding a data packet, where the cluster MAC address is not bound to any port, and therefore, a layer-3 device and a layer-2 device broadcast the data packet through all ports, and an NLB node, outside the first NLB cluster to which the data packet needs to be sent, also receives the data packet, which leads to increase of network burdens and waste of bandwidth.

To reduce network burdens and bandwidth waste, this embodiment provides the following procedure:

41. The layer-3 device broadcasts an ARP request packet, where a destination IP address of the ARP request packet is an IP address of a target cluster. In this embodiment, a case that the target cluster is the first NLB cluster is used as an example. Therefore, the destination IP address of the ARP request packet is an IP address of the first NLB cluster.

For example, the layer-3 device broadcasts the ARP request packet through all of its ports, that is, port_31, port_32, and port_33. The ARP request packet arrives at each NLB node after passing through each layer-2 device.

42. An NLB node of the first NLB cluster returns an ARP response packet. A source MAC address of an Ethernet header of the ARP response packet is a private MAC address of the NLB node, and an ARP packet part of the ARP response packet is filled with a cluster MAC address of the first NLB cluster.

That is, NLB node_11 and NLB node_12 send ARP response packets; source MAC addresses of Ethernet frame headers are private MAC addresses of NLB node_11 and NLB node_12, and the private MAC addresses may be configured in each NLB node by default, and may be expressed as MAC_1 and MAC_2 respectively, for example. In addition, addresses filled in ARP packet parts of the ARP response packets are a cluster MAC address, which, in this embodiment, is the cluster MAC address of the first NLB cluster and expressed as cluster MAC_1, for example.

The ARP response packet is sent to the layer-3 device through the layer-2 device.

43. The layer-3 device establishes a cluster ARP table, where the cluster ARP table is used to record correspondence between address information of the layer-3 device and an egress port of the layer-3 device.

The egress port of the layer-3 device is a receiving port that receives the ARP response packet, and the address information of the layer-3 device includes a cluster MAC address and a source MAC address. The cluster MAC address and the source MAC address may be obtained from the ARP response packet, the cluster MAC address is located in the ARP packet part of the ARP response packet, and the source MAC address is the source MAC address in the Ethernet frame header of the ARP response packet. In this embodiment, a cluster MAC address is the cluster MAC address of the first NLB cluster, that is, cluster MAC_1; and source MAC addresses are the private MAC addresses of NLB nodes in the first NLB cluster, and are MAC_1 and MAC_2 respectively.

For example, in the foregoing scenario, the layer-3 device receives an ARP response packet from port_31, a source MAC address included in the ARP response packet is MAC_1, and a cluster MAC address in the packet is cluster MAC_1; in addition, the layer-3 device receives another ARP response packet from port_32, a source MAC address included in the ARP response packet is MAC_2, and a cluster MAC address in the packet is also cluster MAC_1. Therefore, the ARP table established by the layer-3 device includes an entry shown in Table 1:

TABLE 1

| Cluster MAC address | Source MAC address | Egress port of layer-3 device |
|---|---|---|
| Cluster MAC_1 | MAC_1 | port_31 |
| Cluster MAC_1 | MAC_2 | port_32 |

Optionally, in VLAN-based layer-2 forwarding, the notification message may further include VLAN information, and the VLAN information may be obtained from the ARP response packet. It is assumed that both the VLAN information included in the ARP response packet sent by NLB node_11 and the VLAN information included in the ARP response packet sent by NLB node_12 are VLAN_1.

44. The layer-3 device sends a notification message to a layer-2 device through the port that receives the ARP response packet, where the notification message includes the VLAN information, the cluster MAC address, and the source MAC address.

For example, the layer-3 device receives the ARP response packets through port_31 and port_32, but receives no ARP response packet through port_33. Therefore, the notification messages are sent to layer-2 device_1 and layer-2 device_2 through port_31 and port_32 respectively, but not to layer-2 device_3.

In addition, correspondence between the VLAN information, the cluster MAC address, and the source MAC address may be determined according to the cluster ARP table, and the VLAN information, the cluster MAC address, and the source MAC address are sent accordingly. For example, a notification message sent from port_31 includes VLAN_1, cluster MAC_1, and MAC_1, and a notification message sent from port_32 includes VLAN_1, cluster MAC_1, and MAC_2.

45. The layer-2 device searches for an egress port of the layer-2 device according to the source MAC address, and establishes a cluster MAC table, where the cluster MAC table is used to record correspondence between address information of the layer-2 device and the egress port of the layer-2 device.

Through static configuration or dynamic learning, the layer-2 device may obtain correspondence between a private MAC address of an NLB node under the layer-2 device and an egress port of the layer-2 device. For example, the layer-2 device_1 obtains correspondence between port_21 and MAC_1 in advance.

Therefore, after receiving the notification message, the layer-2 device may obtain a corresponding egress port of the layer-2 device according to the received source MAC address, that is, the private MAC address of the NLB node, and then may establish the correspondence between the egress port of the layer-2 device and the address information of the layer-2 device, where the address information of the layer-2 device includes the cluster MAC address or includes the cluster MAC address and VLAN information.

For example, layer-2 device_1 may establish a cluster MAC entry shown in Table 2, and layer-2 device_2 may establish a cluster MAC entry shown in Table 3:

TABLE 2

| Cluster MAC address | VLAN information | Egress port of layer-2 device |
|---|---|---|
| Cluster MAC_1 | VLAN_1 | port_211 |

TABLE 3

| Cluster MAC address | VLAN information | Egress port of layer-2 device |
|---|---|---|
| Cluster MAC_1 | VLAN_1 | port_221 |

In this way, a data path from the layer-3 device to the layer-2 device has been established. Afterward, when the IP network sends a data packet to an NLB cluster, the data packet may be sent to a target NLB cluster only, instead of being broadcast.

For example, when a packet needs to be sent to the first NLB cluster, a destination IP address of the data packet sent by the IP network is the cluster IP address of the first NLB cluster, and the data packet arrives at the layer-3 device first; the layer-3 device encapsulates the received data packet with an Ethernet header according to configured correspondence between a cluster IP address and a cluster MAC address; a destination MAC address of the Ethernet header is the cluster MAC address of the first NLB cluster, that is, cluster MAC_1; and the cluster MAC address may be determined according to the configured correspondence between the cluster IP address and the cluster MAC address. Then, according to the cluster ARP table, the layer-3 device finds the egress port of the layer-3 device corresponding to the cluster MAC address, such as the foregoing port_31 and port_32, and, through port_31 and port_32, sends the data packet in which the cluster MAC address is encapsulated, that is, sends the data packet to layer-2 device_1 and layer-2 device_2. After receiving the data packet, the layer-2 device determines an egress port of the layer-2 device corresponding to the destination MAC address of the received data packet according to the cluster MAC table, and sends the data packet from the corresponding egress port. Taking layer-2 device_1 as an example, after receiving a data packet sent by the layer-3 device, layer-2 device_1 finds a port corresponding to cluster MAC_1, that is, port_211, according to the cluster MAC table and the destination MAC address of the packet, that is, cluster MAC_1, and then sends the data packet to NLB node_11 from port_211. Similarly, layer-2 device_2 performs similar processing, and then layer-2 device_2 sends the data packet to NLB node_12 through port_221. In addition, during VLAN information-based layer-2 forwarding, the layer-2 device may further determine the egress port of the layer-2 device corresponding to the cluster MAC address and the VLAN information in the packet according to the VLAN information, and forward the packet from the corresponding egress port of the layer-2 device.

In this way, the data packet sent by the IP network is sent to the target NLB cluster only, instead of being broadcast to all NLB nodes.

Optionally, this embodiment may further include:

In 43, the layer-3 device may set aging time for each egress port of the layer-3 device, and then send a deletion message to the layer-2 device after the aging time is reached, where the deletion message is used to instruct the layer-2 device to delete the cluster MAC table. After aging time of port_31 arrives, the layer-3 device sends a deletion message to layer-2 device_1 through port_31, so that layer-2 device_1 deletes the cluster MAC table.

Optionally, in 44, the layer-2 device may set aging time for each egress port of the layer-2 device, and then delete a corresponding entry in the cluster MAC table after the aging time is reached. For example, after aging time of port_211 arrives, layer-2 device_1 deletes an entry that is in the cluster MAC table of layer-2 device_1 and corresponds to port_211.

In this embodiment, through combination of layer 2 and layer 3, in an NLB cluster scenario, network broadcast traffic can be reduced, packet processing of the server can be reduced, and system burdens can be reduced.

Figure 6:
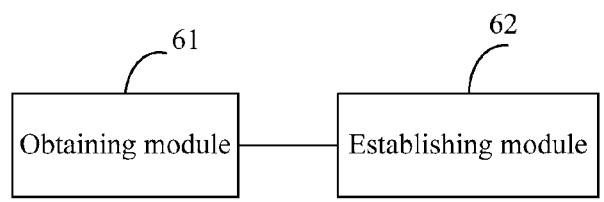
FIG. 6 is a schematic structural diagram of an embodiment of a processing device for controlling packet broadcast according to the present invention.

FIG. 6 is a schematic structural diagram of an embodiment of a processing device for controlling packet broadcast according to the present invention. The device includes an obtaining module 61 and an establishing module 62. The obtaining module 61 is configured to obtain a cluster MAC address, and determine an egress port of a first device corresponding to the cluster MAC address; the establishing module 62 is configured to establish a cluster table, where the cluster table is used to record correspondence between address information and the egress port of the first device, and the address information includes the cluster MAC address, so that the first device forwards a packet from the egress port of the first device corresponding to the cluster MAC address according to the cluster table after receiving the packet whose destination MAC address is the cluster MAC address.

Optionally, the device is a layer-3 device; and the obtaining module is specifically configured to: broadcast an ARP request packet, and receive an ARP response packet, where the ARP response packet includes a cluster MAC address of a target NLB cluster; and determine that a receiving port that receives the ARP response packet is the egress port of the first device corresponding to the cluster MAC address; and the establishing module is specifically configured to: establish a cluster ARP table, where the cluster ARP table is used to record correspondence between address information of the layer-3 device and an egress port of the layer-3 device, the address information of the layer-3 device includes the cluster MAC address, and the egress port of the layer-3 device is the receiving port that receives the ARP response packet.

Optionally, the ARP response packet further includes a private MAC address of an NLB node of the target NLB cluster; the address information of the layer-3 device further includes a source MAC address, where the source MAC address is the private MAC address of the NLB node; the device further includes a sending module, configured to send a notification message to a layer-2 device through the egress port of the layer-3 device, where the notification message includes the cluster MAC address and the source MAC address so that the layer-2 device establishes correspondence between address information of the layer-2 device and an egress port of the layer-2 device according to the cluster MAC address and the source MAC address.

Optionally, the device is a layer-2 device; and the obtaining module is specifically configured to: receive a notification message sent by a layer-3 device, where the notification message includes the cluster MAC address and a source MAC address; and determine an egress port of the layer-2 device corresponding to the source MAC address according to the source MAC address, and determine that the egress port of the layer-2 device is the egress port of the first device corresponding to the cluster MAC address.

The establishing module is specifically configured to establish a cluster MAC table, where the cluster MAC table is used to record correspondence between address information of the layer-2 device and the egress port of the layer-2 device, and the address information of the layer-2 device includes the cluster MAC address.

Optionally, the notification message further includes VLAN information; the address information of the layer-2 device further includes the VLAN information so that the layer-2 device forwards a packet from the egress port of the layer-2 device corresponding to the cluster MAC address and the VLAN information, where a destination MAC address of the packet is the cluster MAC address, and a VLAN to which the packet belongs is a VLAN indicated by the VLAN information.

Optionally, the device further includes a setting module, configured to set aging time for each egress port of the layer-3 device, and send a deletion message to the layer-2 device through an egress port of the layer-3 device that reaches the aging time, so that the layer-2 device deletes a cluster MAC table after receiving the deletion message.

Optionally, the device further includes a processing module, configured to: delete the cluster MAC table after receiving a deletion message sent by the layer-3 device; or, set aging time for each egress port of the layer-2 device, and delete an entry that is in the cluster MAC table and corresponds to an egress port of the layer-2 device that reaches the aging time.

In this embodiment, a cluster table is established, where the cluster table records correspondence between a cluster MAC address and an egress port of a first device. Therefore, after the first device determines that a destination MAC address of a packet is the cluster MAC address, the first device may forward the packet through the corresponding egress port according to the correspondence, without the need of broadcasting the packet through all egress ports, thereby reducing network traffic burdens.

Figure 7:
FIG. 7 is a schematic structural diagram of another embodiment of a processing device for controlling packet broadcast according to the present invention.

FIG. 7 is a schematic structural diagram of another embodiment of a processing device for controlling packet broadcast according to the present invention. The device includes a processor 71 and a transceiver 72. The processor 71 is configured to obtain a cluster MAC address, and determine an egress port of a first device corresponding to the cluster MAC address; and establish a cluster table, where the cluster table is used to record correspondence between address information and the egress port of the first device, and the address information includes the cluster MAC address, so that the first device forwards a packet from the egress port of the first device corresponding to the cluster MAC address according to the cluster table after receiving the packet whose destination MAC address is the cluster MAC address.

Optionally, the device is a layer-3 device; the transceiver 72 is configured to broadcast an ARP request packet, and receive an ARP response packet, where the ARP response packet includes a cluster MAC address of a target NLB cluster; and the processor 71 is specifically configured to establish a cluster ARP table, where the cluster ARP table is used to record correspondence between address information of the layer-3 device and an egress port of the layer-3 device, the address information of the layer-3 device includes the cluster MAC address, and the egress port of the layer-3 device is a receiving port that receives the ARP response packet.

Optionally, the ARP response packet further includes a private MAC address of an NLB node of the target NLB cluster; the address information of the layer-3 device further includes a source MAC address, where the source MAC address is the private MAC address of the NLB node; the transceiver 72 is further configured to send a notification message to a layer-2 device through the egress port of the layer-3 device, where the notification message includes the cluster MAC address and the source MAC address so that the layer-2 device establishes correspondence between address information of the layer-2 device and an egress port of the layer-2 device according to the cluster MAC address and the source MAC address.

Optionally, the device is a layer-2 device; the transceiver 72 is configured to receive a notification message sent by a layer-3 device, where the notification message includes the cluster MAC address and the source MAC address; and the processor 71 is specifically configured to determine an egress port of the layer-2 device corresponding to the source MAC address according to the source MAC address, and establish a cluster MAC table, where the cluster MAC table is used to record correspondence between address information of the layer-2 device and the egress port of the layer-2 device, and the address information of the layer-2 device includes the cluster MAC address.

Optionally, the notification message further includes VLAN information; the address information of the layer-2 device further includes the VLAN information so that the layer-2 device forwards a packet from the egress port of the layer-2 device corresponding to the cluster MAC address and the VLAN information, where a destination MAC address of the packet is the cluster MAC address, and a VLAN to which the packet belongs is a VLAN indicated by the VLAN information.

Optionally, when the device is a layer-3 device, the processor 71 is further configured to set aging time for each egress port of the layer-3 device; and the transceiver 72 is further configured to send a deletion message to the layer-2 device through an egress port of the layer-3 device that reaches the aging time, so that the layer-2 device deletes the cluster MAC table after receiving the deletion message.

Optionally, when the device is a layer-2 device, the processor 71 is further configured to: delete the cluster MAC table after receiving the deletion message sent by the layer-3 device; or, set aging time for each egress port of the layer-2 device, and delete an entry that is in the cluster MAC table and corresponds to an egress port of the layer-2 device that reaches the aging time.

The transceiver may be a stand-alone sender and a stand-alone receiver which execute a sending function and a receiving function respectively, and may also be an integrated device that has a sending function and a receiving function. Specifically, the transceiver may be implemented by using a network cable, an optical fiber, or an antenna, where the antenna may be a linear antenna, a loop antenna, an array antenna, or the like.

The processor may be a universal processor, a digital signal processor (DSP), an application-specific integrated circuit (ASIC), a field programmable gate array (FPGA) or another programmable logical device, a discrete gate or transistor logic device, or a discrete hardware component. The universal processor may be a microprocessor or any conventional processor. In this embodiment, a cluster table is established, where the cluster table records correspondence between a cluster MAC address and an egress port of a first device. Therefore, after the first device determines that a destination MAC address of a packet is the cluster MAC address, the first device may forward the packet through the corresponding egress port according to the correspondence, without the need of broadcasting the packet through all egress ports, thereby reducing network traffic burdens.

Figure 8:
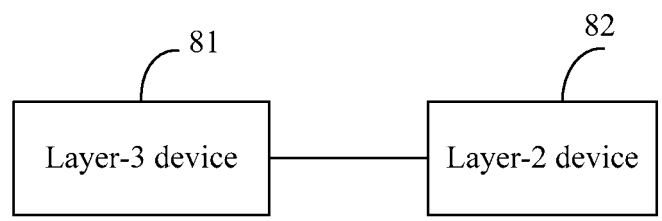
FIG. 8 is a schematic structural diagram of an embodiment of a processing system for controlling packet broadcast according to the present invention.

FIG. 8 is a schematic structural diagram of an embodiment of a processing system for controlling packet broadcast according to the present invention. The system includes a layer-3 device 81 and a layer-2 device 82. The layer-3 device 81 is configured to: broadcast an ARP request packet, and receive an ARP response packet, where the ARP response packet includes a cluster MAC address of a target NLB cluster and a private MAC address of an NLB node of the target NLB cluster; establish a cluster ARP table, where the cluster ARP table is used to record correspondence between address information of the layer-3 device and an egress port of the layer-3 device, the address information of the layer-3 device includes the cluster MAC address and a source MAC address, and the source MAC address is the private MAC address of the NLB node; and send a notification message to a layer-2 device through the egress port of the layer-3 device, where the notification message includes the cluster MAC address and the source MAC address; and the layer-2 device 82 is configured to: receive the notification message sent by the layer-3 device, where the notification message includes the cluster MAC address and the source MAC address; determine an egress port of the layer-2 device corresponding to the source MAC address according to the source MAC address; and establish a cluster MAC table, where the cluster MAC table is used to record correspondence between address information of the layer-2 device and the egress port of the layer-2 device, and the address information of the layer-2 device includes the cluster MAC address.

Optionally, the notification message further includes VLAN information. The address information of the layer-2 device 82 further includes the VLAN information so that the layer-2 device forwards a packet from the egress port of the layer-2 device corresponding to the cluster MAC address and the VLAN information, where a destination MAC address of the packet is the cluster MAC address, and a VLAN to which the packet belongs is a VLAN indicated by the VLAN information.

Optionally, the layer-3 device 81 is further configured to: set aging time for each egress port of the layer-3 device, and send a deletion message to the layer-2 device through an egress port of the layer-3 device that reaches the aging time; and the layer-2 device 82 is further configured to delete the cluster MAC table after receiving the deletion message.

Optionally, the layer-2 device 82 is further configured to set aging time for each egress port of the layer-2 device, and delete an entry that is in the cluster MAC table and corresponds to an egress port of the layer-2 device that reaches the aging time.

In this embodiment, a cluster table is established, where the cluster table records correspondence between a cluster MAC address and an egress port of a first device. Therefore, after the first device determines that a destination MAC address of a packet is the cluster MAC address, the first device may forward the packet through the corresponding egress port according to the correspondence, without the need of broadcasting the packet through all egress ports, thereby reducing network traffic burdens.

It can be clearly understood by a person skilled in the art that, for the purpose of convenient and brief description, division of the foregoing function modules is taken as an example for illustration, in an actual application, the foregoing functions can be allocated to different modules and implemented according to the need, that is, an inner structure of the apparatus is divided into different function modules to implement all or part of the functions described above. For a specific working process of the foregoing system, apparatus and unit, reference may be made to the corresponding process in the method embodiments, and the details will not be described herein again.

In the several embodiments provided in the present invention, it should be understood that the disclosed system, apparatus, and method may be implemented in other manners. For example, the described apparatus embodiment is merely exemplary. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device or the like) or a processor to perform all or a part of steps of the methods described in the embodiments of the present invention. The foregoing storage medium includes: any medium that can store program code, such as a USB flash disk, a removable hard disk, a read-only memory (ROM), a random access memory (RAM), a magnetic disk, or an optical disk.

It should be noted that the foregoing embodiments are merely intended for describing the technical solutions of the present invention rather than limiting the present invention. Although the present invention is described in detail with reference to the foregoing embodiments, a person of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A processing method in Network Load Balancing (NLB), comprising:
    broadcasting, by a layer-3 device, an Address Resolution Protocol (ARP) request packet, wherein a target Internet Protocol (IP) address of the ARP request packet is an IP address of a target NLB cluster, and the target NLB cluster is made up by multiple NLB nodes;

receiving, by the layer-3 device, multiple ARP response packets sent by the multiple NLB nodes, wherein any one of the ARP response packets comprises a cluster media access control (MAC) address of the target NLB cluster, and a source MAC address of an Ethernet header of each of the ARP response packets is a private MAC address of an NLB node sending the ARP response packet;

establishing, by the layer-3 device, correspondence between the cluster MAC address and multiple egress ports of the layer-3 device, wherein the egress ports are ports that receive the multiple ARP response packets;

sending, by the layer-3 device, a notification message to a layer-2 device through a first egress port of the egress ports of the layer-3 device corresponding to the cluster MAC address, wherein the notification message comprises the cluster MAC address and a first MAC address, and the first MAC address is the source MAC address of an ARP response packet, received by the first egress port, of the multiple ARP response packets;

obtaining, by the layer-2 device, a second egress port in an existing MAC table entry of the layer-2 device, wherein the second egress port is a port of the layer-2 device and the second egress port corresponds to the first MAC address in the existing MAC table entry, and correspondence between the first MAC address and the second egress port is obtained by the layer-2 device through static configuration or dynamic learning; and establishing, by the layer-2 device, a cluster MAC table entry, wherein the cluster MAC table entry comprises correspondence between the cluster MAC address in the notification message and the second egress port obtained from the existing MAC table entry.

2. The method according to claim 1, wherein:
the notification message further comprises virtual local area network (VLAN) information; and
the correspondence in the cluster MAC table entry of the layer-2 device further comprises the VLAN information, so that the layer-2 device forwards a data packet through the second egress port corresponding to the cluster MAC address, wherein a destination MAC address of the data packet is the cluster MAC address, and the data packet belongs to a VLAN indicated by the VLAN information.

3. The method according to claim 2, further comprising:
setting, by the layer-3 device, aging time for each egress port of the multiple egress ports of the layer-3 device, and sending a deletion message to the layer-2 device through an egress port whose aging time is reached, so that the layer-2 device deletes the cluster MAC table entry after receiving the deletion message.

4. The method according to claim 2, further comprising:
setting, by the layer-2 device, aging time for the second egress port, and
deleting the cluster MAC table entry, that comprises the second egress port when the aging time of the second egress port is reached.

5. A processing system in Network Load Balancing (NLB), comprising:
multiple NLB nodes;
multiple layer-2 devices; and
a layer-3 device that connects to the multiple NLB nodes through the multiple layer-2 devices, wherein the layer-3 device is configured to:

broadcast an Address Resolution Protocol (ARP) request packet, wherein a target Internet Protocol (IP) address of the ARP request packet is an IP address of a target NLB cluster, and the target NLB cluster is made up by multiple NLB nodes;

receive multiple ARP response packets sent by the multiple NLB nodes, wherein any one of the ARP response packets comprises a cluster media access control (MAC) address of the target NLB cluster, and a source MAC address of an Ethernet header of each of the ARP response packets is a private MAC address of an NLB node sending the ARP response packet;

establish correspondence between the cluster MAC address and multiple egress ports of the layer-3 device, wherein the egress ports are ports that receive the multiple ARP response packets; and send a notification message to a layer-2 device in the multiple layer-2 devices through a first egress port of the egress ports of the layer-3 device corresponding to the cluster MAC address, wherein the notification message comprises the cluster MAC address and a first MAC address, and the first MAC address is the source MAC address of an ARP response packet, received by the first egress port, of the multiple ARP response packets;

the layer-2 device is configured to:
obtain a second egress port in an existing MAC table entry of the layer-2 device, wherein the second egress port is a port of the layer-2 device and the second egress port corresponds to the first MAC address in the existing MAC table entry, and correspondence between the first MAC address and the second egress port is obtained by the layer-2 device through static configuration or dynamic learning; and establish a cluster MAC table entry, wherein the cluster MAC table entry comprises correspondence between the cluster MAC address in the notification message and the second egress port obtained from the existing MAC table entry.

6. The system according to claim 5, wherein:
the notification message further comprises virtual local area network (VLAN) information; and
the correspondence in the cluster MAC table entry of the layer-2 device further comprises the VLAN information, so that the layer-2 device forwards a data packet through the second egress port corresponding to the cluster MAC address, wherein a destination MAC address of the data packet is the cluster MAC address, and the data packet belongs to a VLAN indicated by the VLAN information.

7. The system according to claim 6, wherein:
the layer-3 device is further configured to set aging time for each egress port of the multiple egress ports of the layer-3 device, and send a deletion message to the layer-2 device through an egress port whose aging time is reached; and
the layer-2 device is further configured to delete the cluster MAC table entry after receiving the deletion message.

8. The system according to claim 6, wherein:
the layer-2 device is further configured to set aging time for the second egress port, and delete the cluster MAC table entry, that comprises the second egress port when the aging time of the second egress port is reached.

* * * * *